United States Patent [19]

Tsui et al.

[11] 4,194,206

[45] Mar. 18, 1980

[54] INSTANTANEOUS FREQUENCY MEASUREMENT (IFM) RECEIVER WITH CAPABILITY TO SEPARATE cw AND PULSED SIGNALS

[75] Inventors: James B. Y. Tsui, Centerville; Gerd H. Schrick, Dayton, both of Ohio

[73] Assignee: The United States of America as represented by the Secretary of the Air Force, Washington, D.C.

[21] Appl. No.: 240

[22] Filed: Dec. 22, 1978

[51] Int. Cl.² ........................................... G01S 7/36
[52] U.S. Cl. ................................. 343/18 E; 324/78 F
[58] Field of Search ..................... 324/77 E, 78 F; 343/18 E

[56] References Cited

U.S. PATENT DOCUMENTS

| | | | |
|---|---|---|---|
| 3,922,676 | 11/1975 | O'Berry et al. | 343/18 E X |
| 3,986,188 | 10/1976 | True | 343/18 E |
| 4,025,920 | 5/1977 | Reitboeck et al. | 343/18 E X |
| 4,146,892 | 3/1979 | Overman et al. | 343/18 E |

Primary Examiner—T. H. Tubbesing
Attorney, Agent, or Firm—Joseph E. Rusz; Robert Kern Duncan

[57] ABSTRACT

The video outputs of the correlators of a conventional IFM receiver are split by capacitors to obtain (1) pulse signals only and (2) pulse plus cw signals. Combining these signals in differential amplifiers, frequency readings are provided in the normal manner with the improvement that the individual frequency readings of simultaneously received pulse and cw signals are provided.

2 Claims, 2 Drawing Figures

INSTANTANEOUS FREQUENCY MEASUREMENT (IFM) RECEIVER WITH CAPABILITY TO SEPARATE cw AND PULSED SIGNALS

RIGHTS OF THE GOVERNMENT

The invention described herein may be manufactured and used by or for the Government of the United States for all governmental purposes without the payment of any royalty.

BACKGROUND OF THE INVENTION

The field of the invention is in the high frequency radio receiver art and more particularly that of radar receivers having frequency measuring capability.

The operation of prior art Instantaneous Frequency Measurement (IFM) receivers to receive radar pulses can be, and is, frequently foiled by the presence of a continuous wave (cw) signal of sufficient strength.

The conventional Instantaneous Frequency Measurement (IFM) receiver is a radio frequency (RF) receiver used primarily in electronic warfare (EW). Its basic function is to measure the frequency of pulsed signals radiated from hostile radar. Although some IFM receivers have the capability of measuring pulse amplitude (PA), pulse width (PW), and time of arrival (TOA), this invention is only concerned with the frequency measurement capability of the receiver.

An IFM receiver can have wide (giga hertz) instantaneous frequency bandwidth, and its construction is relatively simple compared with other EW receivers with this capability. However, a major deficiency of an IFM receiver is that it can measure only one signal at a time. When two or more signals arrive at the receiver simultaneously, the receiver may generate erroneous information. If a continuous wave (cw) signal is present at the input of the receiver, any other arriving signal will create a simultaneous signal condition. Therefore, when there is a cw signal at the input of the receiver, the receiver cannot measure a pulsed signal.

The best known prior art is that contained by U.S. Pat. Nos. 3,992,666 to patentees Edwards et al, 3,940,699 to patentee Emgushov, 3,939,411 to patentee James, and 3,465,253 to patentee Rittenbach.

SUMMARY OF THE INVENTION

The circuit for apparatus is disclosed which when added to a conventional IFM receiver provides an improved operational capability to the receiver in that it can now separate and measure the respective frequencies of simultaneously received cw and pulsed signals.

DESCRIPTION OF THE PREFERRED EMBODIMENT

Figure 1:
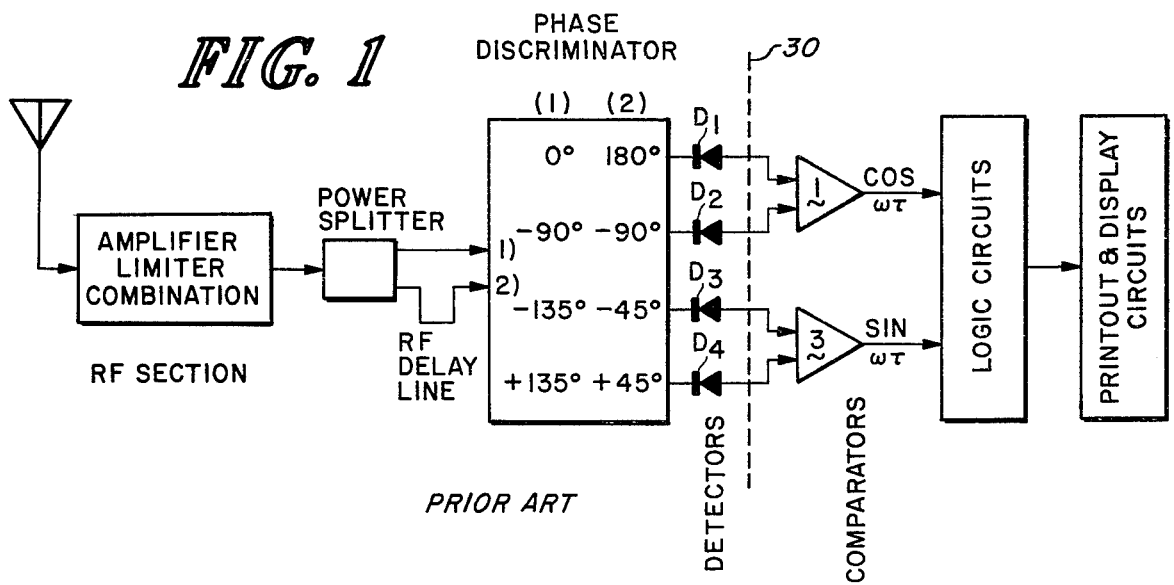
FIG. 1, schematically illustrates a typical prior art IFM receiver.

A typical conventional prior art IFM receiver consists of six major parts: RF section, RF delay line, phase discriminator, diode detectors, comparators, and logic readout and utilization circuits as shown in FIG. 1. An input signal passing through the RF section is separated into two parts: one proceeds directly to the phase discriminator, the other one passes through a delay line before proceeding to the phase discriminator. At the outputs of the discriminator there are four diode detectors followed by comparators and logic circuits.

The RF section of an IFM receiver consists of RF amplifiers and limiters. The amplifiers amplify the input signals to higher power levels. The limiters attenuate only the strong signals and pass the weak ones unattenuated. In the ideal case, the amplifier-limiter combination will produce an output signal at a fixed power level independent of the input signal level. Following the amplifier-limiter combination, is a power divider; which splits the signal into two parts which follow parallel paths.

The RF delay line is in only one of the two parallel signal paths. Its purpose is to slow down the signal it carries and delay its arrival time at the phase discriminator with respect to the other (undelayed) signal. The insertion loss of the delay line should be minimal. It is very important that the delay time be independent of temperature. Otherwise, the frequency reading of the receiver will be temperature dependent, an undesirable condition.

The phase discriminator is a passive microwave circuit which has two inputs and four outputs. It provides proper phase shifts for both input signals, so that at two of the output sine terms are available, while at the other two outputs cosine terms are available. The phase shift for a particular case is shown in FIG. 1.

There are four diode detectors, $D_1$, $D_2$, $D_3$, and $D_4$, one connected at each of the four outputs of the phase discriminators. Their functions are twofold: first they convert microwave signals to video signals, and second they perform a mathematical "square" on the microwave signals. At the output of the detectors, all the high frequency terms are filtered out by the use of low pass filters, only the video signal can pass. The four diode outputs implementing the "squaring" function, can be represented by: $1+\cos \omega\tau$, $1-\cos \omega\tau$, $1+\sin \omega\tau$, and $1-\sin \omega\tau$, where $\omega$ is the angular frequency and $\tau$ is the delay time of the delay line.

The comparators perform a mathematical "substract" function. Each comparator has two inputs and one output. The output equals the difference of the two inputs. The outputs from the detectors are connected to the inputs of the comparators. The $1+\cos \omega\tau$ and $1-\cos \omega\tau$ terms are fed into one comparator and its output is $2 \cos \omega\tau$. The outputs $1+\sin \omega\tau$ and $1-\sin \omega\tau$ terms are fed to the other comparator and its output is $2 \sin \omega\tau$. By measuring the $\cos \omega\tau$ and $\sin \omega\tau$ terms, the frequency of the output signal can be obtained.

The logic circuits are used to measure the $\sin \omega\tau$ and $\cos \omega\tau$ terms and generate frequency information in digital form for display and utilization. Although the logic circuits are very important in an IFM receiver, they are not critical to this invention. Therefore, a detailed discussion of the conventional logic circuits is not presented here.

The foregoing briefly describes the typical prior art IFM receiver.

THE NOVEL IMPROVED RECEIVER

By adding six operational amplifiers, four capacitors, and 4 clamping diodes in a novel circuit to a conventional IFM receiver provides it with the capability to separate simultaneously received one cw and one pulsed train signal, and the receiver will be able to encode the cw and pulsed signals correctly.

Figure 2:
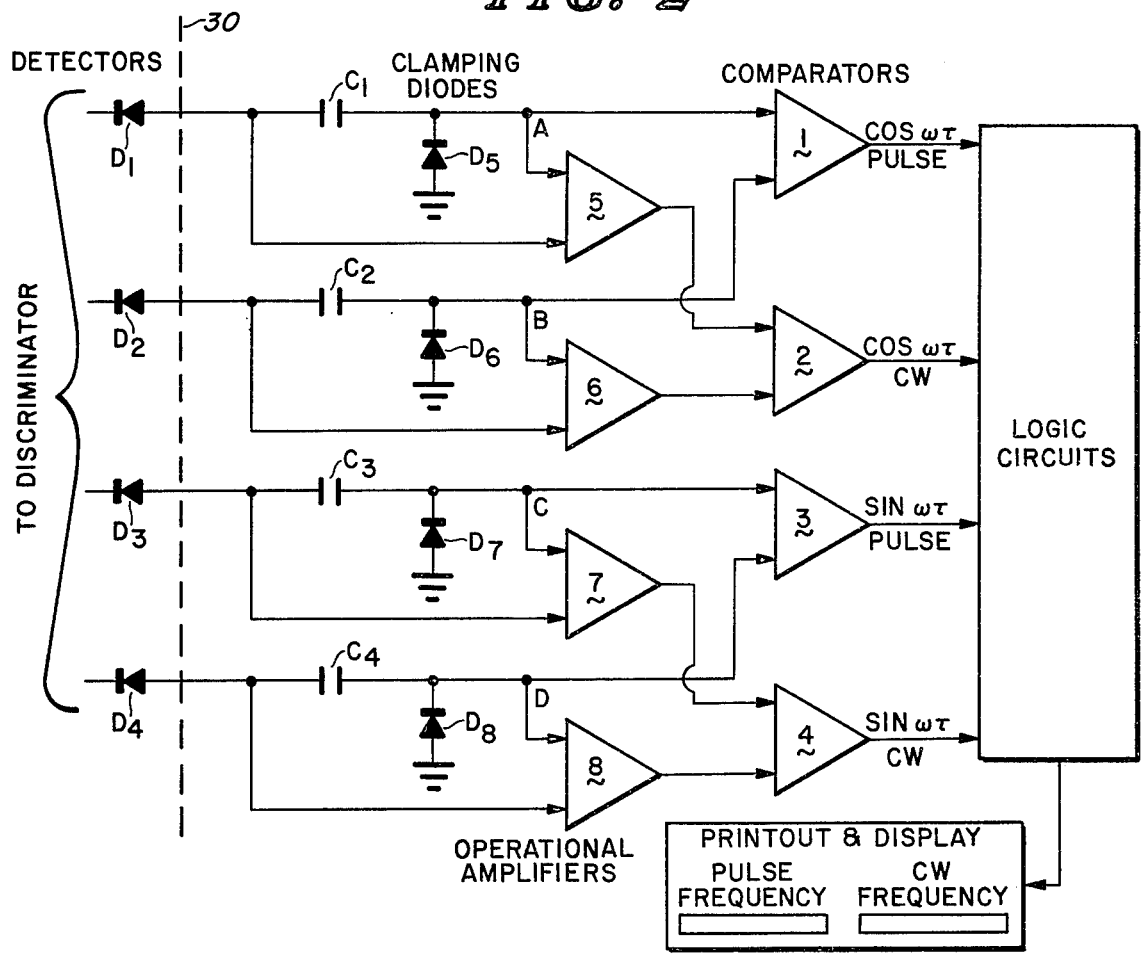
FIG. 2 schematically illustrates a preferred embodiment of the invention.

The conventional IFM receiver as illustrated in FIG. 1 is modified back of line 30 with a circuit as illustrated in FIG. 2. Thus, in this invention providing an improved receiver, the RF section, RF delay line, phase discriminator, and detectors remain unchanged as they are in the conventional IFM receiver. The change comprising the improvement resides primarily in the comparator circuits (plus the added conventional logic circuits and conventional display circuits to utilize the new function provided by the improved receiver). Instead of feeding the outputs from the detectors $D_1$, $D_2$, $D_3$, and $D_4$ directly to the comparators, the outputs of the detectors are divided into two parts, following different paths; one from diodes $D_1$, $D_2$, $D_3$, and $D_4$ going respectively to the capacitors $C_1$, $C_2$, $C_3$, and $C_4$ and the other path going respectively to operational amplifiers 5, 6, 7, and 8. They are referred to C respectively as the pulse path and the cw path.

In the pulse path, capacitors $C_1$, $C_2$, $C_3$, and $C_4$, and diodes $D_5$, $D_6$, $D_7$, and $D_8$, are added. The capacitors form an alternating current (AC) coupling and block the direct current (DC). Therefore, at points A, B, C, and D only pulsed video information is available and the cw (becoming DC after passing through the detectors) signal is removed. Diodes $D_5$, $D_6$, $D_7$, and $D_8$ are used as clamping diodes; their function is to remove the DC components from averaging the pulsed video signals. Comparators 1 and 3 are used to generate the sin $\omega\tau$ and cos $\omega\tau$ respectively for the pulsed signals.

In the cw signal path, comparators 5, 6, 7, and 8 are added. Their function is to obtain the difference of two input signals. Since one of the input signals is the pulsed video signals, and the other one is the sum of the cw and pulsed signal, the outputs of these comparators are the cw signal. Therefore, a cw signal alone is present at the outputs of the operational amplifiers. Comparators 2 and 4 take only the cw signal as the input signals, therefore, the sin $\omega\tau$ and cos $\omega\tau$ terms of the cw signal are present at their outputs respectively. In this modified and improved IFM receiver, cw and pulsed signals are thus separated.

The basic logic circuits following the comparators generally need not be changed. However, some suplications of the circuitry may be desired to utilize and/or display the newly acquired cw signal information.

The disclosed invention will provide an IFM receiver with the capability of separating cw and pulsed signals. Without this invention, IFM receivers may generate erroneous information when both cw, and pulsed signals are present at the input of the receiver. After the modification, not only will the generation of erroneous information be eliminated, but the IFM receiver with its associated circuitry will be able to encode both the cw and pulsed signals simultaneously. However, it is to be noted that the receiver will not be able to separate either simultaneously received pulsed signals or simultaneously received cw signals.

We claim:

1. The improvement in an instantaneous frequency measurement (IFM) receiver to provide frequency measurement of simultaneously received pulse and continuous wave (cw) signals, the said receiver having receiving means including a phase discriminator and detectors providing outputs represented by $1+\cos \omega\tau$, $1-\cos \omega\tau$, $1+\sin \omega\tau$, and $1-\sin \omega\tau$ of the received signals, the said improvement comprising:
   a. a first means cooperating with the outputs of the said diode detectors for providing a pulse signal path that generates a first output signal represented by sin $\omega\tau$ of the said received pulse signals and a second output signal represented by cos $\omega\tau$ of the said received pulse signals:
   b. a second means cooperating with the outputs of the said diode detectors for providing a cw signal path that generates a first output signal represented by sin $\omega\tau$ of the said received cw signal and a second output signal represented by cos $\omega\tau$ of the said received signal;
   c. means cooperating with the said first and second output signal of the said first means and the said first and second output signal of the said second means for providing the said frequency of the said received pulse signal and the said frequency of the said simultaneously received cw signal.

2. The improvement in an instantaneous frequency measurement (IFM) receiver to provide frequency measurement of pulse signals received simultaneously with a continuous wave (cw) signal, the said receiver having receiving means including a phase discriminator and diode detectors providing outputs represented by $1+\cos \omega\tau$, $1-\cos \omega\tau$, $1+\sin \omega\tau$, and $1+\sin \omega\tau$ of the said received signals, the said improvement comprising:
   a. means including a plurality of capacitors and a plurality of clamping diodes in one-to-one correspondence cooperating with the outputs of the said diode detectors providing a first signal path having only pulsed video information signals of the said received pulse signals, and a second signal path having signals representative of the sum of the said received pulse signals and the said simultaneously received cw signal;
   b. means including a first plurality of comparators cooperating with the said first signal path providing a first output signal representative of sin $\omega\tau$ of the said received pulse signals, and a second output signal representative of cos $\omega\tau$ of the said received pulse signals;
   c. means including a second plurality of comparators cooperating with the said first signal path and the said second signal path providing difference signals representative only of the said received cw signal;
   d. means including a third plurality of comparators responsive to the said difference signals providing a first output signal representative of sin $\omega\tau$ of the said received cw signal and a second output signal representative of cos $\omega\tau$ of the said received cw signal; and
   e. means including logic and display circuits responsive to the said signals cos $\omega\tau$ and sin $\omega\tau$ of the said received pulse signals, and cos $\omega\tau$ and sin $\omega\tau$ of the said received cw signal for providing the frequency of the said pulse signal and the frequency of the said cw signal.

* * * * *